Patented July 26, 1949

2,477,544

UNITED STATES PATENT OFFICE 2,477,544

CARBOXYALKYL ETHERS OF CARBOHYDRATE GUMS

Owen A. Moe, Minneapolis, Minn., assignor to General Mills, Inc., a corporation of Delaware No Drawing. Application August 25, 1945, Serial No. 612,717

4 Claims. (Cl. 260—209)

The present invention relates to carboxyalkyl ethers of carbohydrate gums and to methods of producing the same.

Carbohydrate gums such as locust bean gum are frequently used in aqueous solution. In general, they are extremely difficult to dissolve, requiring long periods of soaking before they can be thoroughly dispersed. This is a particular disadvantage where an aqueous sol of such a gum is desired on short notice. In addition, such gums frequently do not disperse completely, and sols of commercially available gums are usually turbid and contain suspended solid particles. Moreover, such sols are usually fairly viscous and accordingly incapable of filtration for removal of the suspended solid.

It has now been discovered that carboxyalkyl ethers, and especially alkali metal salts of the carboxyalkyl ethers of these gums are readily dispersible and form sols of excellent clarity, as compared to untreated gum. The carboxyalkyl ethers of galactomannan gums and glucomannan gums, those containing galactose and mannose units and glucose and mannose units respectively in the gum structure, produce sols of a viscosity comparable to that of the untreated gum. Typical of the galactomannan gums are guar, locust bean, honey locust, flame tree, and the like. Typical of the glucomannans is iles mannan, and the like. In some instances the viscosity of the treated gum may be increased somewhat. It has been noted moreover, that the carboxyalkyl ethers of such gums form gels on addition of a dilute solution of metal salts such as ferrous sulfate. These gels are very firm and can be transferred from one container to another without wetting the surface.

It is therefore a primary object of the present invention to provide novel carboxyalkyl ethers of carbohydrate gums. It is a further object of the present invention to provide alkali metal salts of carboxyalkyl ethers of carbohydrate gums, said compounds being capable of ready dispersibility in aqueous media and formation of relatively clear sols. It is a further object of the present invention to provide carboxyalkyl ethers of galactomannan and glucomannan type gums which are capable of forming gels from aqueous sol by means of solutions of metal salts such as ferrous sulfate. It is another object of the present invention to provide a process for making such products.

The carboxyalkyl ethers may be formed by treating the gum with a cold aqueous solution of an alkali such as sodium hydroxide and then treating the alkali gum with a halo fatty acid or halo fatty acid salt. In general, the treatment of the gum with the cold solution of alkali serves to disperse the gum without the occurrence of lumping. It is also possible to disperse the gum in aqueous alkali at a more elevated temperature by a more efficient stirring means. After dispersion of the gum in the aqueous alkali, the mixture is heated to an elevated temperature such as 60-90° C. and the reaction mixture will then frequently become semi-solid. This mass is then cooled and broken up into fine particles and treated with the etherifying agent, usually in the form of a halo fatty acid or salt thereof. This reaction mixture is then heated to a temperature of 80-85° C. for an appreciable period of time, 1 or 2 hours, with efficient mixing. The reaction mixture is then cooled and diluted with water and made acidic to phenolphthalein. The reaction product may then be precipitated by the addition of a water miscible organic solvent such as methanol, acetone, and the like, and may be washed with a solvent of appropriate concentration for further removal of impurities and then dried and ground.

Any of the galactomannan and glucomannan carbohydrate gums may be treated according to the present invention. Numerous examples of such gums have been mentioned herein and other examples will be apparent to those skilled in the art. Other alkalies such as potassium hydroxide, may be used in place of the sodium hydroxide. In the examples given hereinafter chloracetic acid and its salts are preferred as the etherifying agent in view of the ready availability of this material. Other etherifying agents such as chloropropionate, chlorobutyrate, or other halo fatty acids or salts thereof may be used in place of the chloracetate if desired. Instead of using the gum in a pure isolated form it is also possible to use impure forms of the gum, such as those obtained by merely grinding to a powder the entire seed or other form in which the gum occurs naturally. The carboxyalkyl ethers of the impure forms of gum display the same ready dispersibility and also display remarkable clarity considering the relatively impure nature of the starting material. They will not, in general, however, produce as clear sols as will the ethers of the purified gums.

The following examples will serve to illustrate the invention.

*Example 1*

This example demonstrates the preparation of a carboxymethyl derivative of a gum which yields mannose on hydrolysis. Forty parts of locust bean gum are dispersed in 150 parts of 7% sodium hydroxide solution cooled to 0° C. The alkali-gum mixture was heated in a water bath to 80° C. and the reaction mixture became semi-solid. The resulting mass was firm and rubbery-like. After cooling, this mass was broken up into fine particles and the solution of the sodium chloracetate (23.5 parts of chloracetic acid in 50 parts of water was neutralized with 10 parts of sodium hydroxide in 20 parts of water) was added with efficient mixing. The resulting reaction mixture was heated in a water bath to 80-85° C. for a period of 90 minutes with efficient mixing. After cooling, the reaction mixture was diluted with 200 cc. of water and made acidic to phenolphthalein by addition of dilute acetic acid. The reaction product was precipitated by the addition of methanol. The precipitated product thus obtained was washed with methanol, dried and ground to a powder. The sodium carboxymethyl ether of locust bean gum thus prepared was readily dispersible in water to form 1% sols of remarkable clarity and stability and of a viscosity comparable to or higher than than that of the gum itself. A 3% sol of very good clarity and high viscosity was very readily obtained. These sols formed gels which were firm when a solution of a metallic salt such as ferrous sulfate was added. The gels may be prepared in the following manner: Three to five parts of a 10% ferrous sulfate solution are added to 10 parts of a 3% carboxymethyl gum ether sol with efficient mixing. The gel formation takes place rapidly as the sol is stirred. It is, of course, apparent that the concentration of the ferrous sulfate and gum derivative sols may be varied over a wide range.

*Example 2*

This example demonstrates the preparation of carboxymethyl ether of a mannogalactan gum which yields mannose and galactose on hydrolysis. Forty parts of guar gum were dispersed in 220 parts of 10% sodium hydroxide solution cooled to 0° C. The resulting alkali-gum mixture was heated in a water bath to 80° C. with mixing. The mixture was cooled to room temperature and 24 parts of finely powdered chloracetic acid were stirred in with cooling. After the addition of chloracetic acid was complete, the reaction mixture was heated in a water bath with mixing for a period of 90 minutes at 80° C. The reaction mixture was then diluted with 500 cc. of water and neutralized with dilute acid. The reaction product was precipitated by the addition of methanol and the cooled product was worked up in the usual manner. This sodium carboxymethyl gum ether yielded viscous 2-4% sols in water and displayed good clarity and stability. This derivative dispersed in water at a surprisingly rapid rate and these aqueous sols displayed a gel formation upon the addition of a dilute ferrous sulfate solution. The gel formation takes place rapidly with stirring after the addition of the ferrous sulfate solution.

*Example 3*

This example demonstrates the preparation of a sodium carboxymethyl gum ether starting with a gum flour. Twenty parts of iles mannan flour were easily dispersed uniformly in 60 parts of 33% sodium hydroxide solution cooled to 0° C. This alkali-gum mixture was heated in a water bath and a solid, rubber-like mixture resulted. This solid, rigid, yet rubber-like mass was cooled and ground into fine particles. Then 22 parts of chloracetic acid were mixed in well with cooling. After the addition of the etherifying agent was complete, the resulting reaction mixture was heated in a water bath to 80° C. and maintained at this temperature for a period of 90 minutes. The mixture was made acidic to phenolphthalein, cooled and diluted with 300 parts of water. The reaction mixture was dark in color and the reaction product was precipitated by the addition of methanol removing nearly all of the dark color. The precipitated product was treated in a normal manner. This sodium carboxymethyl gum ether prepared from a gum yielding mannose on hydrolysis was readily dispersible in cold water to yield viscous 2-4% sols of good clarity and stability. This product also showed the gel formation on the addition of a dilute ferrous sulfate solution. However, the tendency towards this gels formation was not as pronounced as in the cases of the derivatives from locust bean gum and guar gum.

The products of this general type find manifold uses. The derivatives displaying good viscosity are excellent thickening agents for printing pastes. The products of this invention find numerous applications such as dressing and sizing agents, and uses in emulsions, cosmetics, lotions, and the like.

While various modifications of the invention have been described herein in detail it will be apparent that other variations are possible without departing from the spirit of the invention. It is to be understood, therefore, that the details are illustrative only and that the invention is to be limited only by the appended claims.

I claim as my invention:

1. A process of producing a carboxyalkyl ether of a carbohydrate gum selected from the group consisting of galactomannans and glucomannans which comprises dispersing the carbohydrate gum in a solution of an alkali, and then reacting the dispersed carbohydrate gum with an etherifying agent selected from the group consisting of the halo lower fatty acids and salts thereof.

2. A process of producing a carboxyalkyl ether of a carbohydrate gum selected from the group consisting of galactomannans and glucomannans, which comprises dispersing the carbohydrate gum at a low temperature in an aqueous solution of an alkali, heating the resultant mixture to an elevated temperature, and then reacting the mixture with an etherifying agent selected from the group consisting of the halo lower fatty acids and salts thereof.

3. A process of producing a carboxyalkyl ether of a carbohydrate gum selected from the group consisting of galactomannans and glucomannans, which comprises dispersing the carbohydrate gum in an aqueous solution of an alkali at a temperature of approximately 0° C., raising the temperature of the resulting mixture to a temperature within the approximate range of 60-90° C. for an extended period of time, cooling the reaction mixture, breaking the reaction mixture up into the form of small solid particles, mixing these solid particles with an etherifying agent selected from the group consisting of the halo lower fatty acids and salts thereof, heating the resultant mixture to a temperature within the approximate range of 80-85° C. for an extended period of time, thereafter cooling the reaction mixture and diluting it with water, and precipitating the reaction product from the water by means of a water miscible organic solvent.

4. A process of producing a carboxyalkyl ether of a carbohydrate gum selected from the group consisting of galactomannans and glucomannans, which comprises dispersing the carbohydrate in the form of finely divided endosperm particles derived from seeds containing such gums in an aqueous alkali at a low temperature, heating the mixture to a temperature within the approximate range of 60-90° C. for an extended period of time, cooling the reaction mixture, breaking the reaction mixture up in the form of finely divided particles, reacting the finely divided particles with an alkali metal salt of chloracetic acid at an elevated temperature for an extended period of time, diluting the reaction mixture with water, and precipitating the reaction product from the water by means of a water miscible organic solvent.

OWEN A. MOE.

REFERENCES CITED

The following references are of record in the file of this patent:

UNITED STATES PATENTS

| Number | Name | Date |
|---|---|---|
| 1,350,820 | Lilienfeld | Aug. 24, 1920 |
| 1,504,178 | Young | Aug. 5, 1924 |
| 2,190,179 | Ziese et al. | Feb. 13, 1940 |
| 2,316,128 | Bock | Apr. 6, 1943 |
| 2,344,179 | Stahly | Mar. 14, 1944 |
| 2,388,887 | Weissberger | Nov. 13, 1945 |